(12) United States Patent
Wang

(10) Patent No.: US 6,606,309 B1
(45) Date of Patent: Aug. 12, 2003

(54) TIME-MULTIPLEXED SHORT MESSAGE ACKNOWLEDGEMENT SYSTEMS AND METHODS

(75) Inventor: Yi-Pin Eric Wang, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1211 days.

(21) Appl. No.: 08/752,020

(22) Filed: Nov. 19, 1996

(51) Int. Cl.$^7$ .............................. H04B 7/212; H04J 3/12
(52) U.S. Cl. ..................... 370/322; 370/337; 370/522; 455/466
(58) Field of Search ................................. 370/326, 321, 370/329, 336, 337, 345, 348, 347, 447, 522, 322; 455/434, 466

(56) References Cited

U.S. PATENT DOCUMENTS

| | | | | |
|---|---|---|---|---|
| 5,502,725 A | * | 3/1996 | Pohjakallio | 370/337 |
| 5,729,541 A | * | 3/1998 | Hamalainen | 370/337 |
| 5,778,316 A | * | 7/1998 | Persson | 455/434 |
| 5,796,726 A | * | 8/1998 | Hassan | 370/322 |
| 5,822,310 A | * | 10/1998 | Chennakeshu | 370/317 |

FOREIGN PATENT DOCUMENTS

| | | | |
|---|---|---|---|
| EP | 0 553 952 A1 | 8/1993 | ........... H04B/7/208 |
| EP | 0 633 671 A2 | 1/1995 | ............ H04B/7/26 |
| HU | 215619 B | 10/1996 | |

OTHER PUBLICATIONS

Raymond Macario, Cellula radio principles and design, p. 163, Jan. 1993.*
Hungarian Search Report, Hungarian Application No. P0000251, Jun. 27, 2000.
PCT International Search Report, PCT/US97/20256, Jul. 15, 1998.

* cited by examiner

Primary Examiner—Hassan Kizou
Assistant Examiner—Afsar M. Qureshi
(74) Attorney, Agent, or Firm—Myers Bigel Sibley & Sajovec

(57) ABSTRACT

Access requests are communicated from a plurality of radiotelephones to a central station over a random access channel carrier frequency band during a first RACH message time window. Short message acknowledgements are communicated from the plurality of radiotelephones to the central station over the random access channel carrier frequency band during a second RACH message time window, in response to short messages communicated from the central station to the plurality of radiotelephones. Preferably, the first RACH message time window includes a first set of TDMA time slots in a group of TDMA control channel multiframes, and the second RACH message time window includes a second set of TDMA time slots in the group of TDMA control channel multiframes, thereby forming a RACH multiframe. Preferably, the first and second RACH message time windows are separated by a guard time. A radiotelephone communications signal representing a short message acknowledgement encoded according to a predetermined short message code, preferably previously communicated to a radiotelephone in a short message from the central station, may be transmitted from the radiotelephone. The radiotelephone communications signal is received at the central station and decoded according to the predetermined short message code to thereby recover a short message acknowledgement. The plurality of radiotelephones may be arranged into paging groups, each having a unique short message code assigned thereto, and a limited number of short message including the unique short message code may be communicated during a given RACH multiframe.

28 Claims, 11 Drawing Sheets

TIME-MULTIPLEXED SHORT MESSAGE ACKNOWLEDGEMENT SYSTEMS AND METHODS

FIELD OF THE INVENTION

The present invention relates to communications systems and methods, in particular, to radiotelephone communications systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

FIG. 1 illustrates a typical terrestrial cellular radiotelephone communication system 20 as in the prior art. The cellular radiotelephone system may include one or more radiotelephones 21, communicating with a plurality of cells 36 served by base stations 23 and a mobile telephone switching office (MTSO) 25. Although only three cells 36 are shown in FIG. 1, a typical cellular network may comprise hundreds of cells, may include more than one MTSO, and may serve thousands of radiotelephones.

The cells 36 generally serve as nodes in the communication system 20, from which links are established between radiotelephones 21 and the MTSO 25, by way of the base stations 23 serving the cells 36. Each cell will have allocated to it one or more dedicated control channels and one or more traffic channels. The control channel is a dedicated channel used for transmitting cell identification and paging information. The traffic channels carry the voice and data information. Through the cellular network 20, a duplex radio communication link 32 may be effected between two mobile stations 21 or between a radiotelephone 21 and a landline telephone user 33. The function of the base station 23 is commonly to handle the radio communication between the cell and the mobile station 21. In this capacity, the base station 23 functions chiefly as a relay station for data and voice signals.

As illustrated in FIG. 2, satellites 110 may be employed to perform similar functions to those performed by base stations in a conventional terrestrial radiotelephone system, for example, in areas where population is sparsely distributed over large areas or where rugged topography tends to make conventional landline telephone or terrestrial cellular telephone infrastructure technically or economically impractical. A satellite radiotelephone system typically includes one or more satellites 110 which serve as relays or transponders between one or more earth stations 130 and radiotelephones 21. The satellite communicates with radiotelephones 21 and earth stations 130 over duplex links 170. The earth station may in turn be connected to a public switched telephone network 140, allowing communications between satellite radiotelephones, and communications between satellite radio telephones and conventional terrestrial cellular radiotelephones or landline telephones. The satellite radiotelephone system may utilize a single antenna beam covering the entire area served by the system, or, as shown, the satellite may be designed such that it produces multiple minimally-overlapping beams 150, each serving distinct geographical coverage areas 160 in the system's service region. A satellite 110 and coverage area 160 serve functions similar to that of a base station 23 and cell 36, respectively, in a terrestrial cellular system.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands presents several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots, as illustrated in FIG. 3. Although communication on frequency bands $f_1-f_m$ typically occur on a common TDMA frame 310 that includes a plurality of time slots $t_1-t_n$, as shown, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots. A channel in a TDMA system typically includes one or more time slots on one or more frequency bands.

Because it generally would be inefficient to permanently assign TDMA time slots to a radiotelephone, typical radiotelephone systems assign time slots on an as-needed basis to more efficiently use the limited carrier frequency spectrum available to the system. Therefore, a critical task in radiotelephone communications is providing a radiotelephone with access to the system, i.e., assigning time slots corresponding to a voice or data channel to a radiotelephone when it desires to communicate with another radiotelephone or with a landline telephone or conventional cellular radiotelephone via the PSTN. This task is encountered both when a radiotelephone attempts to place a call and when a radiotelephone attempts to respond to a page from another radiotelephone or conventional telephone.

Access to a radiotelephone communications system may be provided in a number of ways. For example, a polling technique may be utilized whereby a central or base station serially polls users, giving each an opportunity to request access in an orderly fashion, without contention. However, serial polling tends to be impractical for radiotelephone systems because typical radiotelephone systems may have hundreds, if not thousands, of users. Those skilled in the art will appreciate that serially polling this many users can be extremely inefficient, especially when one considers that many of the users may not desire access at all, or may not desire access at the particular moment they are polled.

For this reason, radiotelephone systems typically use random access techniques, whereby a radiotelephone desiring a voice or data channel randomly sends an access request to the base or hub station, which the central or base station may acknowledge by establishing a communications channel to the requesting radiotelephone, if available. An example of a random access technique for a TDMA radiotelephone communications system is that used in the GSM system. In the GSM system, a set of Common Control Channels (CCCHs) is shared by radiotelephones in the system and includes one or more Random Access Channels (RACHs).

If a radiotelephone desires access, the radiotelephone typically transmits a random access channel signal, typically including the radiotelephone's identification and an identification of the telephone the radiotelephone desires to contact, in what is often referred to as a "RACH burst." As illustrated in FIG. 4A, a RACH burst 410 typically contains several fields, including a plurality of guard bits 420, a sequence of synchronization bits 430, and a sequence of information bits 440. The guard bits 420 are used to prevent overlap of communications occurring on adjacent time slots, as discussed below. The synchronization sequence 430 is used by the receiving station to synchronize with the RACH burst, in order to decode the information contained in the information sequence 440. The information sequence 440 may also include a number of sub-fields, for example, a random reference number field 450 which serves as a "tag" for identifying a particular random access request from a particular radiotelephone, as illustrated in FIG. 4B.

In a GSM system, a RACH is a dedicated TDMA time slot on a carrier frequency band, used by radiotelephones to request access to the communications system. Radiotelephones typically time their RACH bursts to fall within an assigned TDMA time slot for the RACH, for example, by waiting a predetermined period after a transition in a synchronization signal transmitted by the base station and then transmitting the RACH burst.

However, because radiotelephones conventionally use a common TDMA time slot for transmitting RACH burst, there is probability of collisions between access requests which are transmitted simultaneously or nearly simultaneously by neighboring radiotelephones. To deal with these collisions, the base station typically implements some form of contention-resolving protocol. For example, the station may refuse to acknowledge simultaneous requests, requiring a requesting radiotelephone to reassert its request if it continues to desire access after failing to establish a channel. Contention-resolving protocols may also use a variety of predetermined delays and similar techniques to reduce the likelihood of radiotelephones engaging in repeated collisions subsequent to a first collision. Contention logic used in the European GSM system is described in The *GSM System for Mobile Communications* published by M. Mouly and M. B. Pautet, 1992, at pages 368–72. Although these contention-resolving protocols may compensate for access failures, they typically do so by incurring additional transmission and processing overhead.

In addition to colliding with other RACH bursts, a RACH burst may overlap other TDMA time slots, causing undue interference on channels using those slots. Before requesting a channel, a radiotelephone may be only roughly synchronized with the base station TDMA frame, for example, by aligning its internal time reference with the synchronization signal transmitted by the base station in an open loop fashion. Finer synchronization, however, typically occurs only after the base station acknowledges the radiotelephone's request for access and provides the radiotelephone with signals which allow the propagation delay between the radiotelephone and the base station to be determined. With this information, the radiotelephone can adjust its TDMA bursts to prevent collision with bursts from other radiotelephones arriving at the base station on adjacent TDMA slots.

However, a radiotelephone requesting access prior to such synchronization generally suffers from a time ambiguity with respect to other TDMA bursts in the system, because propagation delay varies with position in the coverage area. FIG. 5 illustrates timing relationships between a first radiotelephone, closely synchronized and communicating with the base station over a TDMA voice channel, and a second radiotelephone located a distance from the base station which desires access to system. Because the second radiotelephone is only roughly synchronized, its internal timing may be significantly skewed with respect to the TDMA frame of the base station, as illustrated. Uncompensated, this time skew may cause, for example, a RACH burst 510 transmitted by the second radiotelephone to have a significant overlap 520 with voice or data communications transmitted by the first radiotelephone on an adjacent time slot. This overlap may cause undesirable interference and diminish communications quality.

As illustrated in FIG. 6, conventional terrestrial TDMA cellular radiotelephone systems may compensate for this problem by incorporating guard time or guard bits 610 in each TDMA slot, typically preceding data bits 620 which carry synchronization, voice, data or other information. Guard bits are inserted in each time slot, during which the receiving unit disregards incoming signals because they may be corrupted by overlapping RACH bursts and other sources of interference. Because the maximum time ambiguity in a terrestrial radiotelephone system tends to be relatively small with respect to a TDMA frame, the number of guard bits needed to ensure acceptable signal quality typically is small. For example, the GSM system incorporates approximately 68.25 guard bits in each time slot to ensure that RACH bursts from a radiotelephones as far as 35 kilometers away from the base station will not cause undue interference on other TDMA slots.

Using guard times or bits to prevent overlap of RACH bursts tends to be impractical for satellite TDMA radiotelephone systems, however, because the large area covered by a typical satellite beam and the large signal propagation distance from the satellite to the radiotelephone can combine to create time ambiguities far larger than those experienced in conventional terrestrial TDMA cellular radiotelephone systems. For example, a radiotelephone communications signal in a satellite beam having a coverage area of an approximate 500 kilometer radius may have a differential propagation delay approaching 6 milliseconds for a radiotelephone located at the periphery of the coverage area, resulting in a comparable time ambiguity for RACH bursts. As a typical TDMA time frame may be only tens of milliseconds long and have a slot length of only a few microseconds, the number of guard bits needed to prevent interference from unsynchronized RACH bursts can be of a magnitude approaching the duration of an entire TDMA frame, and far longer than an individual time slot. Increasing the TDMA frame length and the time slot length to provide a sufficient number of guard bits generally is not a practical alternative, as this approach would tend to reduce the potential information rate of the communications channels.

A technique for providing access to a TDMA satellite radiotelephone communications system has been proposed in U.S. patent application Ser. No. 08/629,358, filed Apr. 8, 1996, assigned to the assignee of the present invention, which includes using a dedicated RACH carrier frequency band to communicate random access channel radiotelephone communications signals. As illustrated in FIG. 7, for a system using a dedicated RACH carrier frequency band, a RACH message can be communicated during any time slot 720 in a TDMA multiframe 710 on the band and avoid overlap with traffic channels as might occur in a slotted RACH system such as GSM. However, access request collisions may still occur when two radiotelephones transmit RACH signals simultaneously on the RACH carrier frequency band.

Because of the power limitations of satellite transponders and mobile units, mobile satellite communications desirably are dominated by line-of-sight signal components. Under poor transmission conditions e.g., when the mobile unit antenna is not properly deployed or is obstructed by objects such as buildings, reflected waves may dominate line of sight waves, resulting in Rayleigh fading and poor communications quality, to the point that the mobile unit may have difficulty monitoring the paging channel to detect incoming calls. For this reason, some mobile satellite systems employ an enhanced-margin "short message service" (SMS) in which a short, high margin alphanumeric message is supplied to a mobile unit to indicate an incoming call. After receiving the short message, the mobile user may then move to a more favorable location to establish communications. The higher margin for the short message typically is achieved by transmitting at a power level higher than normally used for traffic channels, repeating the short message to allow integration at the receiver in the mobile unit, encoding to increase signal to noise ratio, or a combination thereof. Higher-margin SMS systems are described in U.S. patent application Ser. No. 08/626,182, filed Mar. 29, 1996, assigned to the assignee of the present application.

Short message communication may be unilateral, or the mobile unit may respond with an acknowledgement signal to indicate reception of the short message. Typically, the short message acknowledgment signal is transmitted over the RACH carrier frequency band. To improve the chances of the acknowledgment reaching the central station, it may be transmitted using increased power, bit repetition and coding, i.e., as a high margin RACH (HMRACH). Unfortunately, using increased message repetition generally increases the number of HMRACH bursts, and thus increases the burst rate on the random access channel carrier frequency band. The increased burst rate can in turn increase the probability of collisions on the RACH band. For example, for an unslotted ALOHA random access scheme, the probability of collision $P_{col}$ is given by:

$$P_{col} = 1 - e^{-2T_{slot} \cdot R_{burst}}$$

where $T_{slot}$ is the slot duration for a TDMA frame and $R_{burst}$ is the average rate at which RACH bursts arrive at a receiving station. As can be seen from the above equation, as the rate $R_{burst}$ increases, the probability of RACH collisions also generally increases.

SUMMARY OF THE INVENTION

In the light of the foregoing, it is an object of the present invention to provide systems and methods for communicating acknowledgements to short message service (SMS) messages on a random access channel (RACH) carrier frequency band of a radiotelephone communications system, which reduce the probability of collisions between the acknowledgments and access requests.

This and other objects, features and advantages are provided according to the present invention by radiotelephone communications systems, radiotelephones and methods in which access requests are communicated in a first RACH message time window on a RACH carrier frequency band of a radiotelephone communications system and short message acknowledgements are communicated in a second RACH message time window on the RACH carrier frequency band. If the radiotelephone communications system is a time division multiple access (TDMA) radiotelephone communications system which communicates control messages between a central station and a plurality of radiotelephones over a plurality of carrier frequency bands during a plurality of TDMA control channel multiframes, each of which include a plurality of TDMA time slots, the first RACH message time window preferably includes a first set of TDMA time slots in a group of the TDMA control channel multiframes and the second RACH message time window includes a second set of TDMA time slots in the group of TDMA control channel multiframes, thus forming a RACH multiframe including the first RACH message time window and the second RACH message time window. Preferably, the time windows are separated by a guard time, more preferably, a guard time sufficient to prevent collisions of the access requests and the short message acknowledgements. Reduced probability of collisions between short message acknowledgments can be provided by transmitting the short message acknowledgments encoded according to a predetermined short message codes, preferably spreading codes uniquely assigned to paging groups such that a particular spreading code will be used by a limited number of radiotelephones during a given RACH multiframe.

In particular, according to the present invention, a radiotelephone communications system includes a central station and a plurality of radiotelephones. Short message communicating means communicates alphanumeric messages from the central station to the plurality of radiotelephones. Access request communicating means communicates access requests from the plurality of radiotelephones to the central station over a random access channel (RACH) carrier frequency band during a first RACH message time window, the access requests representing requests for access to the radiotelephone communications system. Short message acknowledgement communicating means, responsive to the short messages, communicates short message acknowledgements from the plurality of radiotelephones to the central station over the RACH carrier frequency band during a second RACH message time window in response to short messages communicated to the radiotelephones.

Preferably, the first and second RACH message time windows are separated by a guard time, preferably a guard time sufficient to prevent collision of the access requests and the short message acknowledgements. The system also preferably includes time division multiple access (TDMA) control message communicating means which communicates control messages between the central station and the plurality radiotelephones over a plurality of carrier frequency bands during a plurality of TDMA control channel multiframes, each of the TDMA control channel multiframes including a plurality of TDMA time slots. The access request communicating means preferably communicates access requests during a first RACH message time window including a first set of TDMA time slots in a group of the TDMA control channel multiframes, and the short message acknowledgment communicating means preferably communicates short message acknowledgements during a second RACH message time window including a second set of TDMA time slots in the group of TDMA control channel multiframes. A RACH multiframe is thereby provide on the RACH carrier frequency band, the RACH multiframe including the first RACH message time window and the second RACH message time window.

According to a preferred embodiment of the present invention, the radiotelephone communications system includes a radiotelephone communications medium over which radiotelephone communications signals are communicated between the central station and the plurality of radiotelephones. Each of the plurality of radiotelephones includes short message acknowledgement transmitting means for transmitting a radiotelephone communications signal representing a short message acknowledgement encoded according to a predetermined short message code, in the radiotelephone communications medium. The central station includes means for receiving a radiotelephone communications signal from the radiotelephone communications medium, and means for decoding the received second radiotelephone communications signal according to the predetermined short message code to thereby recover a short message acknowledgement. The short message communicating means may communicate a short message including the predetermined short message code from the central station to the radiotelephone. To provide for reduced likelihood of collisions of short message acknowledgements, the short message codes may be uniquely assigned to paging groups of radiotelephone's. The short message communicating means may communicate short messages including a unique short message group assigned to a paging group to a predetermined number of radiotelephones, preferably only one, in a paging group during a RACH multiframe.

A radiotelephone according to the present invention includes short message receiving means for receiving short messages from central station and access request transmitting means for transmitting access requests from the radiotelephone over a random access channel (RACH) carrier frequency band during a first RACH message time window, the access request representing a request for access to the radiotelephone communications system. Short message acknowledgement transmitting means is responsive to the short message receiving means for transmitting short message acknowledgements from the radiotelephone over the (RACH) carrier frequency band during a second RACH message time window, each of the short message acknowledgments being transmitted in response to receipt of a short message from the central station at the radiotelephone. The access request transmitting means preferably transmits access requests during a first RACH message time window including a first set of TDMA time slots in a group of the TDMA control channel multiframes. The short message acknowledgment transmitting means preferably transmits short message acknowledgements during a second RACH message time window including a second set of TDMA time slots in the group of TDMA control channel multiframes of a RACH multiframe on the RACH carrier frequency band, the RACH multiframe including the first RACH message time window and the second RACH message time window, preferably separated by a guard time. According to a preferred embodiment, the short message acknowledgment transmitting means includes means for transmitting a radiotelephone communications signal representing a short message acknowledgment encoded according to a predetermined short message code, and the short message receiving means includes means for receiving a short message including the predetermined short message code.

According to method aspects of the present invention, access requests are communicated from a plurality of radiotelephones to a central station over a random access channel carrier frequency band during a first RACH message time window, the access requests representing requests for access to the radiotelephone system. Short message acknowledgements are communicated from the plurality of radiotelephones to the central station over the random access channel carrier frequency band during a second RACH message time window, in response to short messages communicated from the central station to the plurality of radiotelephones. According to a preferred method aspect, access requests are communicated during a first RACH message time window including a first set of TDMA time slots in a group of TDMA control channel multiframes, and short message acknowledgements are communicated during a second RACH message time window including a second set of TDMA time slots in the group of TDMA control channel multiframes, to thereby form a RACH multiframe on the RACH carrier frequency band, the RACH multiframe including the first RACH message time window and the second RACH message time window. Preferably, the first and second RACH message time windows are separated by a guard time, preferably one sufficient to prevent collision of the access requests and the short message acknowledgements.

According to another preferred method aspect, the radiotelephone communications system includes a radiotelephone communications medium over which radiotelephone communications signals are communicated between the central station and the plurality of radiotelephones, and the step of communicating short message acknowledgements includes the step of transmitting a radiotelephone communications signal from one of the radiotelephones, the radiotelephone communications signal representing a short message acknowledgement encoded according to a predetermined short message code, in response to communication of a short message to the one radiotelephone. The radiotelephone communications signal is received at the central station, and decoded according to the short message code to thereby recover a short message acknowledgement. The short message code may be previously communicated from the central station to the one radiotelephone. A unique short message code may be assigned to a paging group of which the one radiotelephone is a member, and a short message including the unique short message code may be communicated to the one radiotelephone. To reduce the likelihood of collisions between short message acknowledgments, the unique short message code may be communicated to a predetermined number of radiotelephones in the paging group, preferably only one, during a RACH multiframe.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
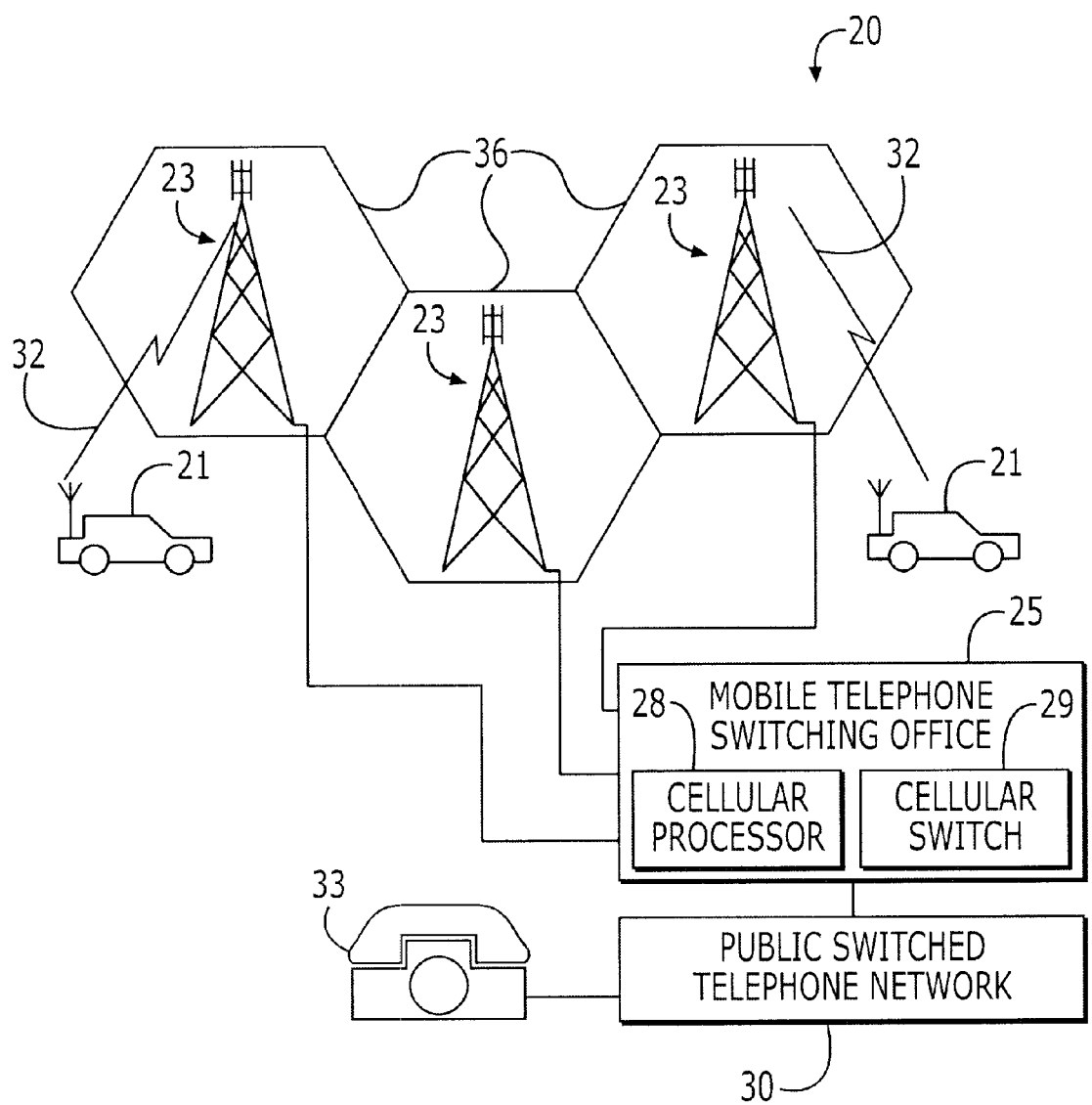
FIG. 1 illustrates a cellular radiotelephone communications system according to the prior art.
Figure 2:
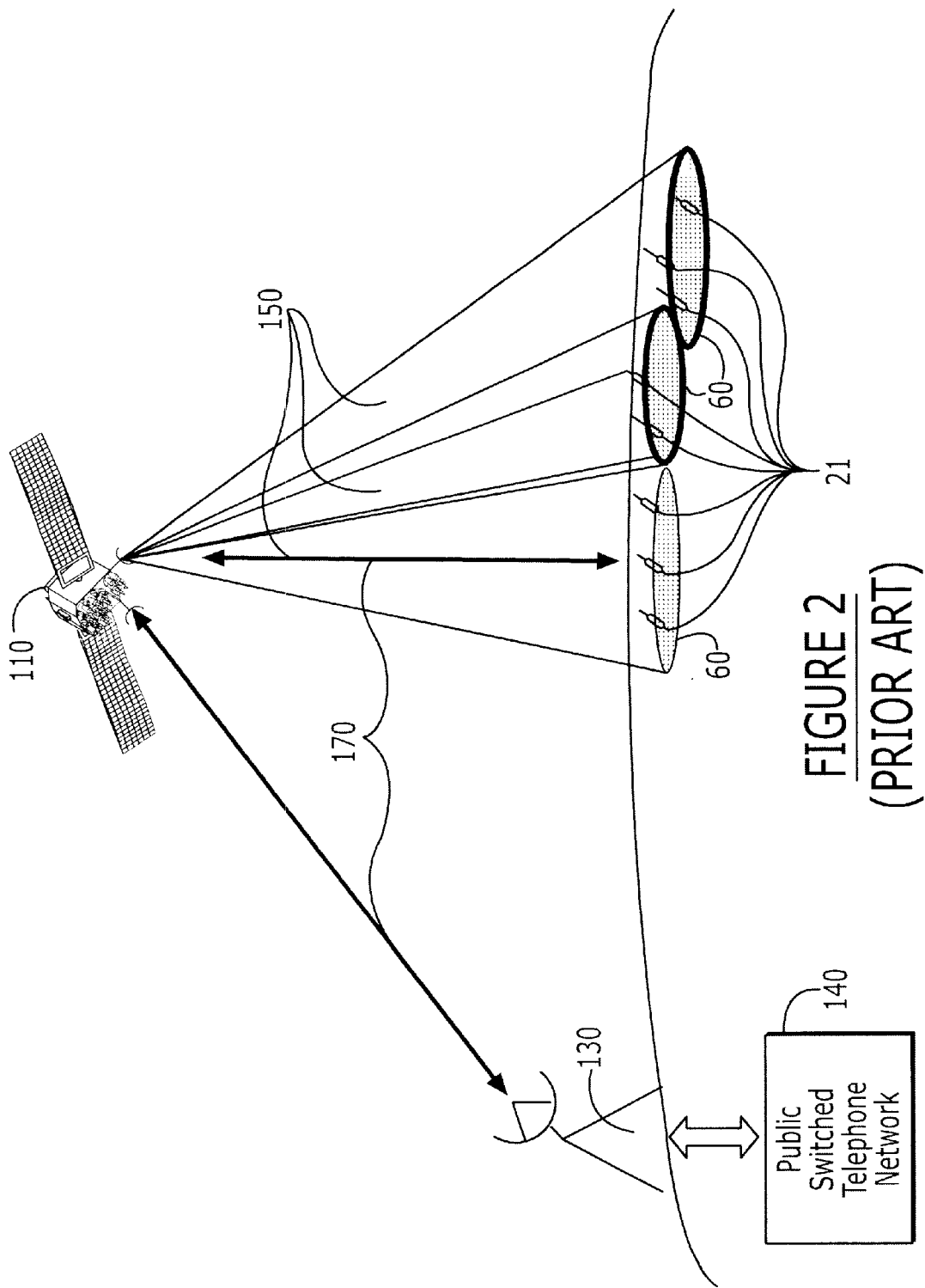
FIG. 2 illustrates a mobile satellite radiotelephone communications system according to the prior art.
Figure 3:
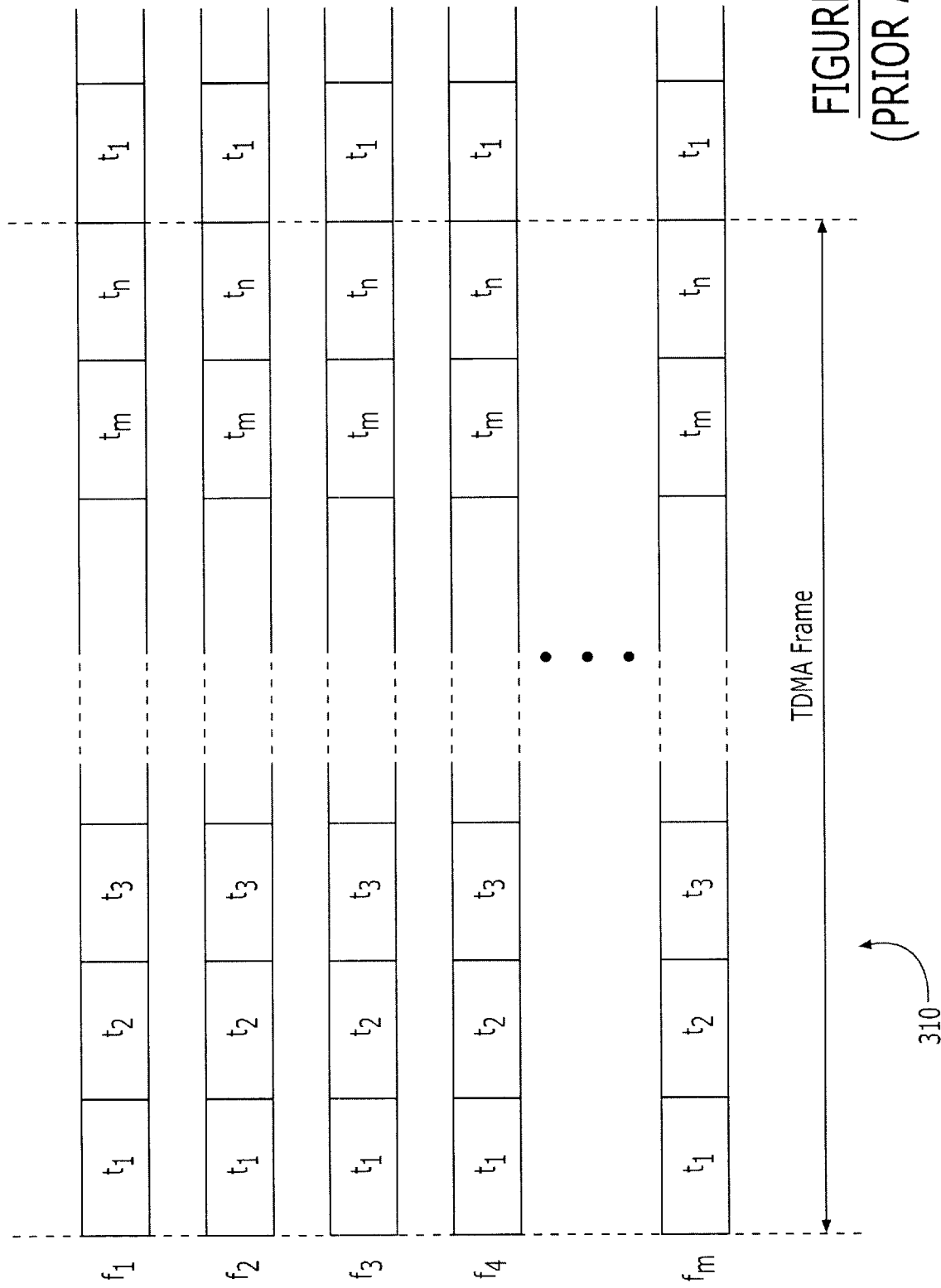
FIG. 3 illustrates time slots on carrier frequency bands of a radiotelephone communications system according to the prior art.
Figure 4A:
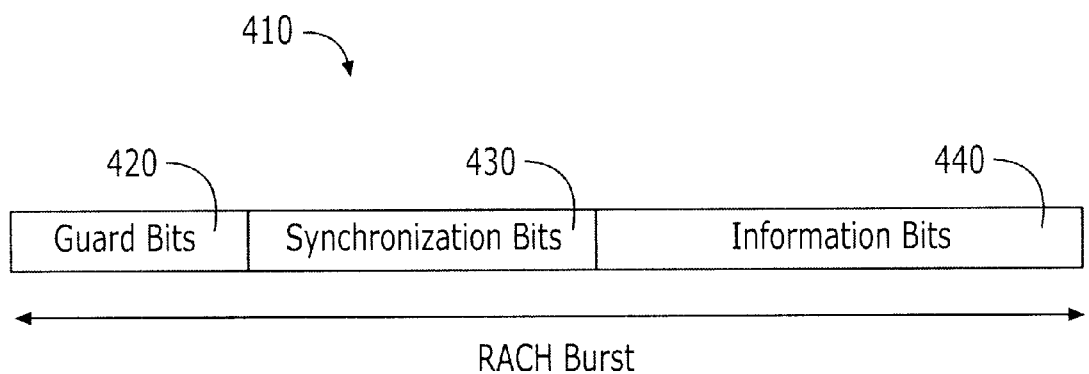
FIGS. 4A–4B illustrate components of a random access channel (RACH) burst according to the prior art.
Figure 4B:
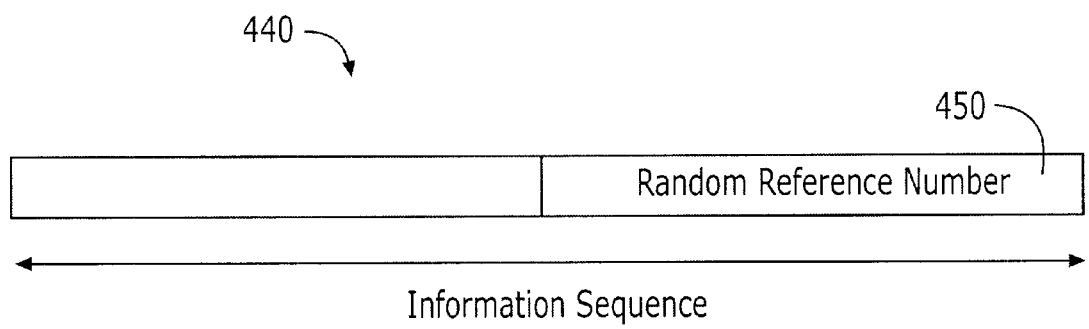
Figure 5:
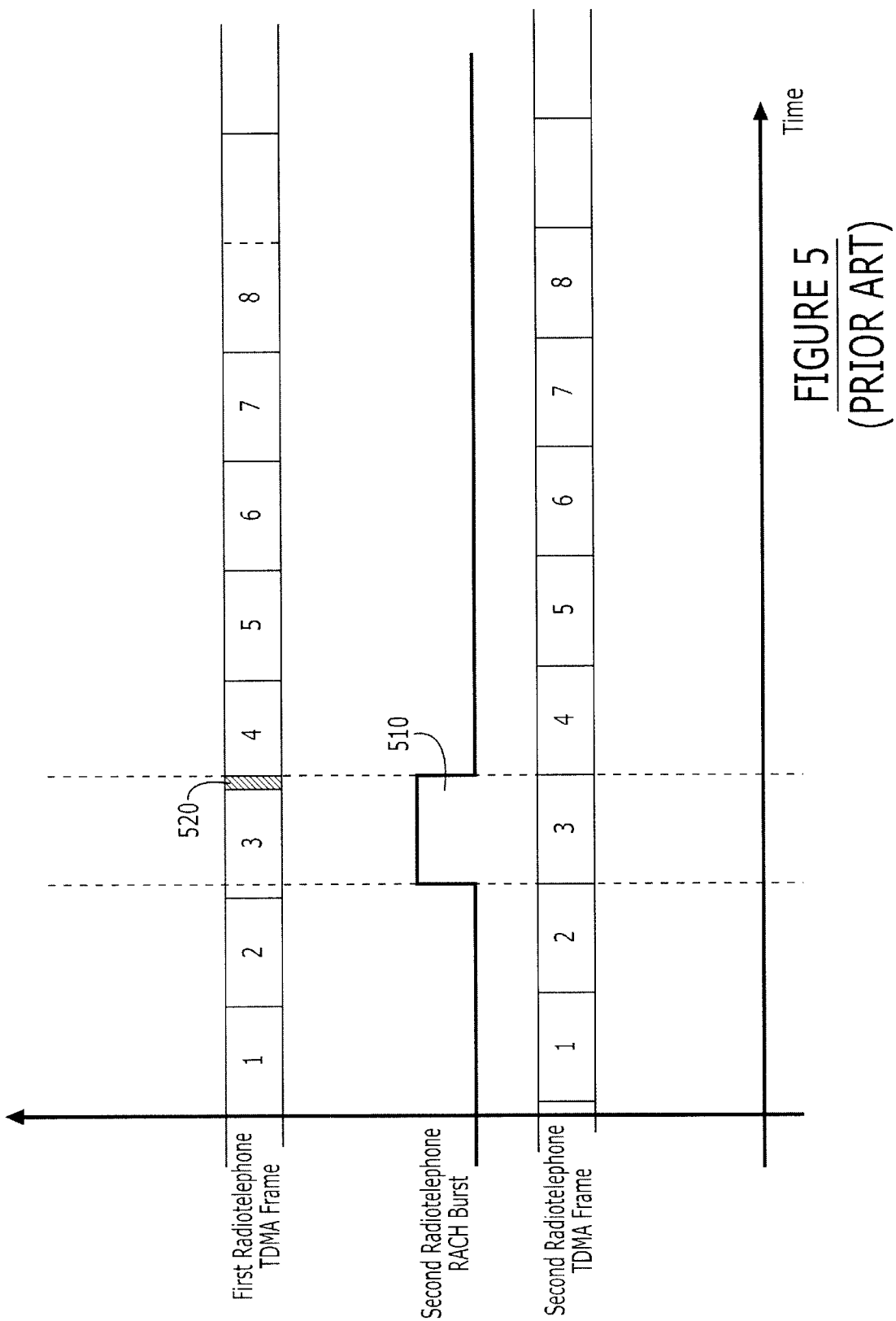
FIG. 5 illustrates time ambiguity in random access channel bursts in a radiotelephone communications system according to the prior art.
Figure 6:
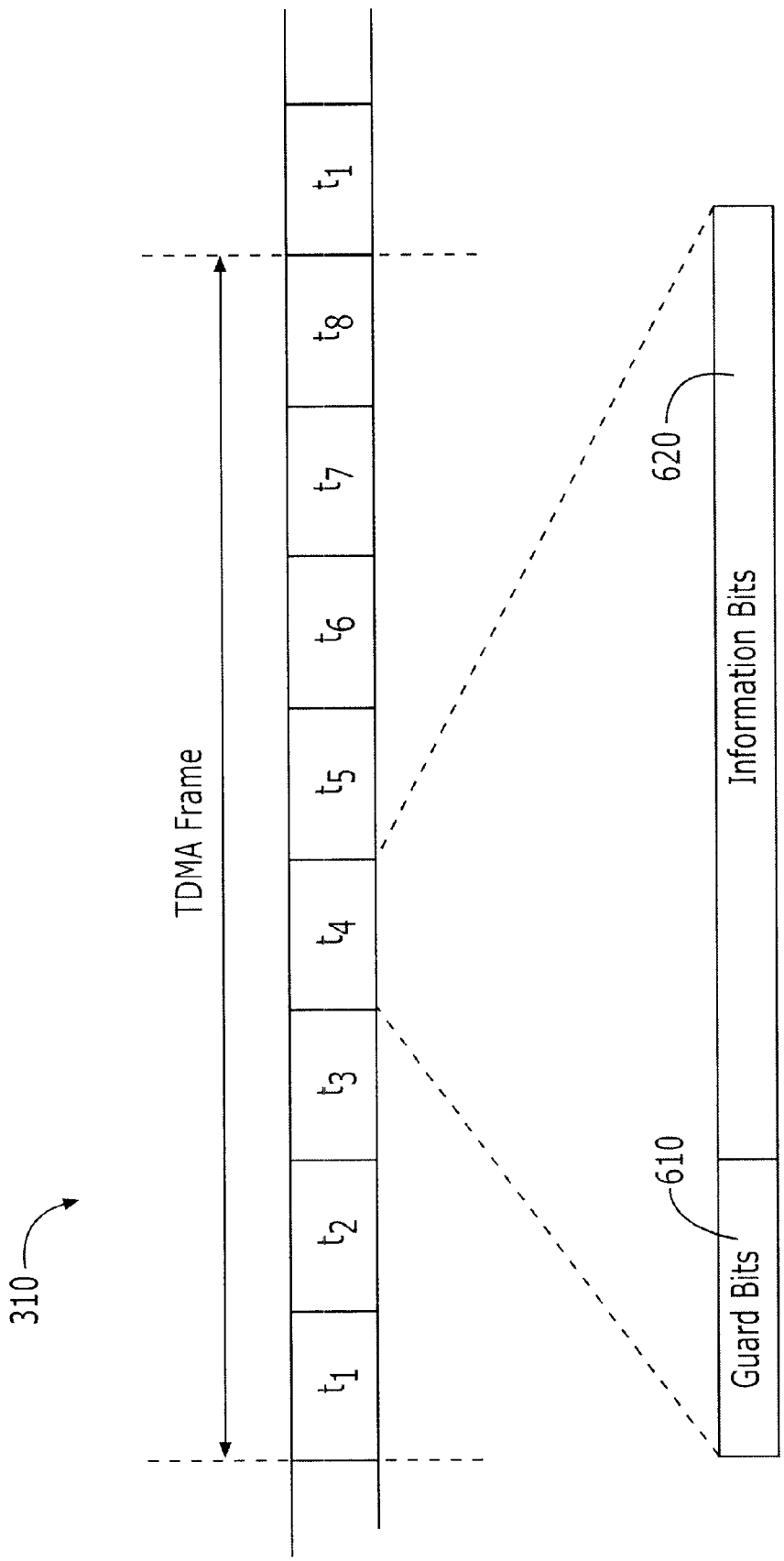
FIG. 6 illustrates a TDMA frame in a radiotelephone communications system according to the prior art.
Figure 7:
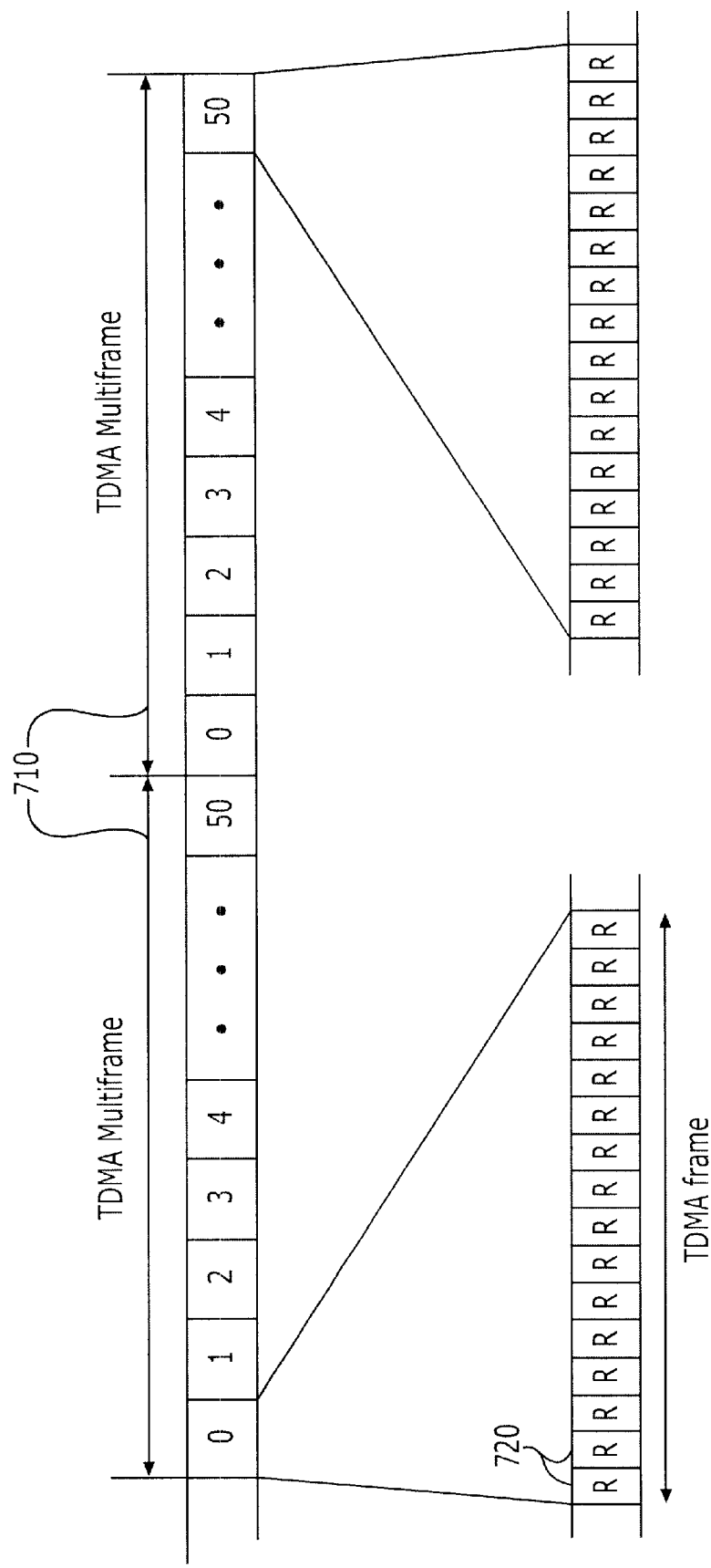
FIG. 7 illustrates a dedicated random access channel (RACH) carrier frequency band for communicating access request RACH bursts in a TDMA radiotelephone communications system according to the prior art.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 8:
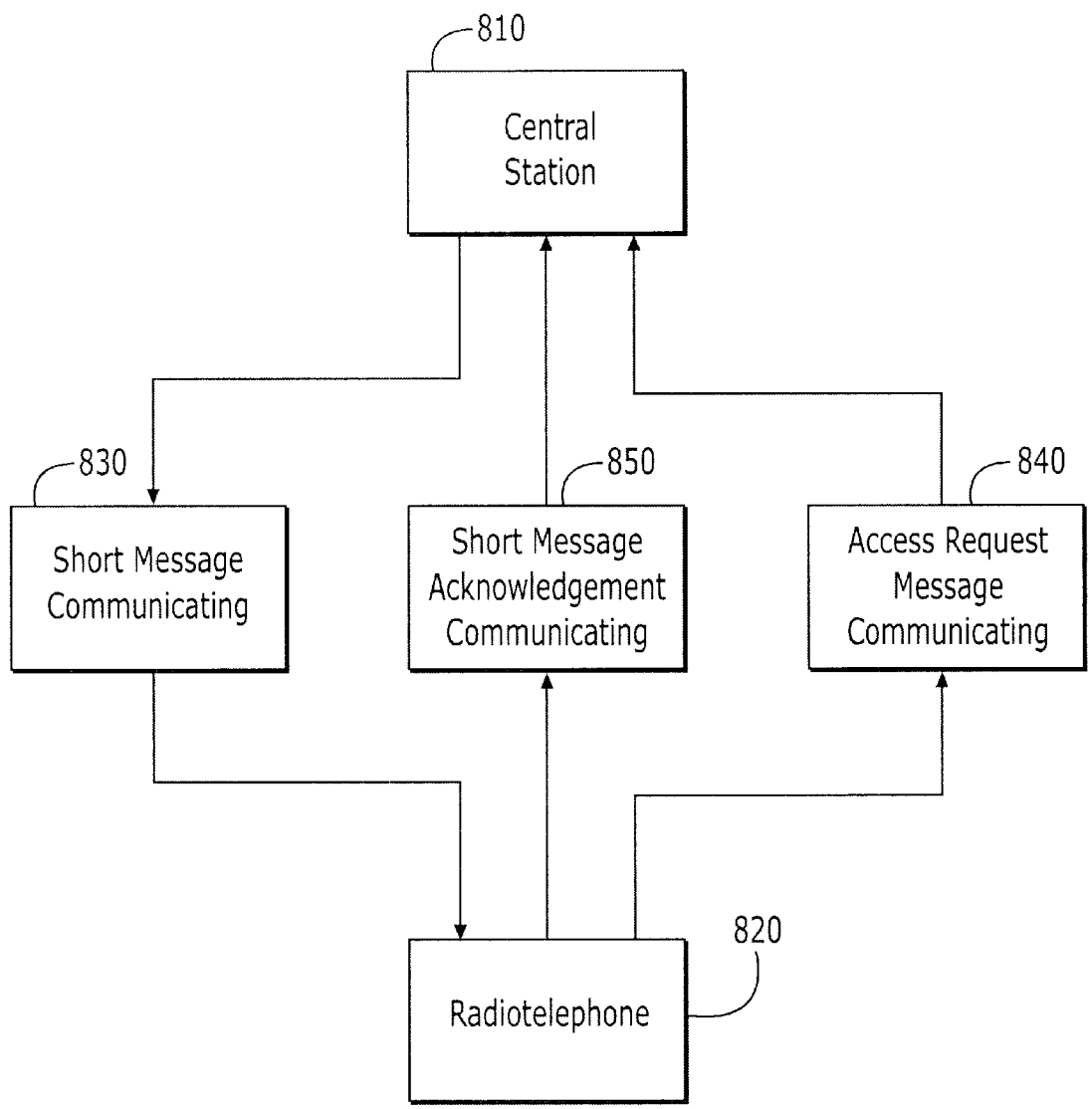
FIG. 8 illustrates a radiotelephone communications system according to the present invention.

FIG. 8 illustrates a radiotelephone communications system according to the present invention, including a central station 810 and at least one radiotelephone 820 communicating with the central station over a plurality of carrier frequency bands. Also illustrated are short message communicating means 830 for communicating alphanumeric messages from the central station 810 to the radiotelephone 820, access request communicating means 840 for communicating access requests from the radiotelephone 820 to the central station 810, and short message acknowledgment communicating means 850 for communicating short message acknowledgments from the radiotelephone 820 to the central station 810 in response to the short messages communicated from the central station 810 to the radiotelephone 820.

As will be understood by those skilled in the art, many radiotelephone systems include a short message service (SMS) which enables the communications of short alphanumeric messages to radiotelephones in the system. This service may be implemented in a number of different ways. In a GSM system, for example, short messages may be transmitted to radiotelephones using a dedicated carrier frequency band or, alternatively, slots on one or more of the common control channels (CCCH's) may be used for communicating short messages. Thus, those skilled in the art will understand that short message communicating means 830 may utilize these and other techniques to communicate short messages from the central station 810 to the radiotelephone 820.

In addition, those skilled in the art will understand that short message communicating means 830 may include typical radiotelephone communications components used to communicate radiotelephone communications messages. For example, in a satellite-based system in which a satellite serves as the central station 810, the short message communicating means may include signal processors, transmitters, antennas, controllers and other telecommunications apparatus located on the satellite, antennas, receivers, signal processors, controllers and other telecommunications apparatus located in the radiotelephone 820, as well as the free-space communications medium over which radiotelephone communications signals representing the short messages are communicated. Similarly, the central station 810 may be an earth station operating through a satellite-based transponder, and the short message communicating means 830 may include receivers, transmitters, antennas, signal processors and other communications apparatus at the earth station and satellite. The operation of these components is well-known and need not be discussed in detail herein. Those skilled in the art will appreciate that generally, short message communicating means 830 may be implemented using special purpose hardware, software running on general purpose data processors, or combinations thereof.

As will also be appreciated by those skilled in the art, in time division multiple access (TDMA) radiotelephone communications systems such as GSM, access requests, i.e., messages sent from a radiotelephone 820 to a central station 810 for requesting access to the radiotelephone system 800, are communicated on a random access channel (RACH) carrier frequency band. In a mobile satellite system, the RACH carrier frequency may be a dedicated carrier frequency band, as the access requests from a radiotelephone seeking access to the communications system 800 may not be sufficiently synchronized to the system to allow communication during a time slot of a carrier frequency band used for voice or other traffic. Access request communicating means 840 communicates access requests from the radiotelephone 820 to the central station 810 over the RACH carrier frequency band. The access request communicating means 840 may communicate an access request as a "burst" in the RACH carrier frequency band. Those skilled in the art will understand that additional techniques, for example, enhanced margin coding, bit repetition and the like, may also be used to communicate access requests according to the present invention.

Those skilled in the art will understand that access request communicating means 840 may include telecommunications components for communicating radiotelephone communications signal representing access requests on such a dedicated carrier frequency band. For example, in a satellite-based system in which a satellite serves as the central station 810, the access request communicating means 840 may include signal processors, transmitters, antennas, controllers and other telecommunications apparatus located in the radiotelephone 820, antennas, receivers, signal processors, controllers and other telecommunications apparatus located at the satellite central station 810, as well as the free-space communications medium over which radiotelephone communications signals representing the short messages are communicated. Similarly, the central station 810 may be an earth station operating through a satellite-based transponder, and the access request communicating means 840 may include receivers, transmitters, antennas, signal processors and other telecommunications apparatus located at the earth station or satellite. The operation of these components is well-known and need not be discussed in detail herein. Those skilled in the art will appreciate that generally, access request communicating means 840 may be implemented using special purpose hardware, software running on general purpose data processors, or combinations thereof.

Short message acknowledgment communicating means 850 communicates a short message acknowledgment on the RACH carrier frequency band between the radiotelephone 820 and the central station 810 in response to a short message communicated from the central station 810 and the radiotelephone 820. Those skilled in the art will understand that the short message acknowledgment communicating means 850 may also employ such margin-enhancing techniques as coding, bit repetition and message repetition.

Those skilled in the art will understand that short message acknowledgment communicating means 850 may include telecommunications components for communicating radiotelephone communications signal representing access requests on such a dedicated carrier frequency band. For example, in a satellite-based system in which a satellite serves as the central station 810, the short message acknowledgment communicating means 850 may include signal processors, transmitters, antennas, controllers and other telecommunications apparatus located at the radiotelephone 820, antennas, receivers, signal processors, controllers and other telecommunications apparatus located at the radiotelephone satellite central station 810, as well as the free-space communications medium over which radiotelephone communications signals representing the short messages are communicated. Similarly, the central station 810 may be an earth station operating through a satellite-based transponder, and the short message acknowledgement communicating means 850 may include receivers, transmitters, antennas, signal processors and other telecommunications apparatus located at the earth station and satellite. The operation of these components is well-known and need not be discussed in detail herein. Those skilled in the art will appreciate that generally, short message acknowledgment communicating means 850 may be implemented using special purpose hardware, software running on general purpose data processors, or combinations thereof.

Figure 9:
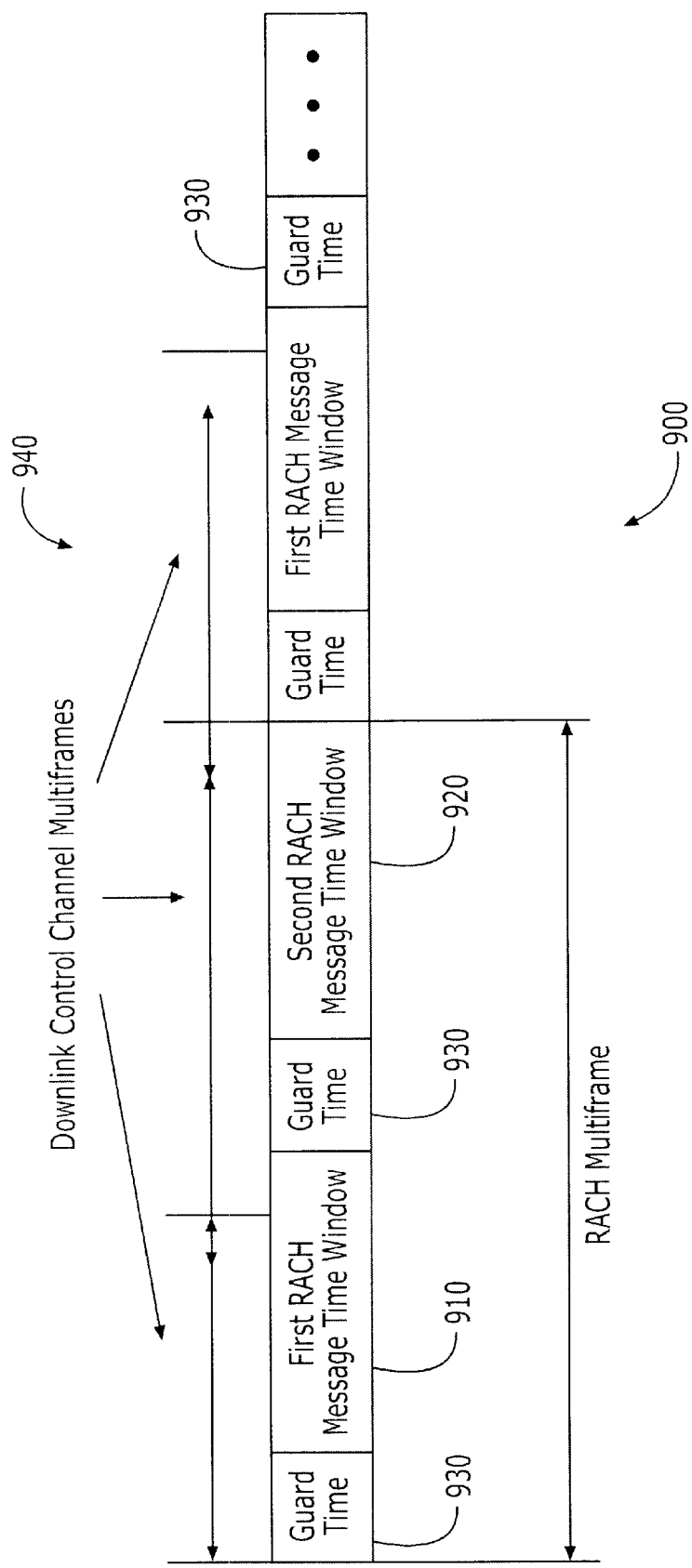
FIG. 9 illustrates a RACH multiframe embodiment according to the present invention.

FIG. 9 is a timing diagram of a preferred RACH multiframe 900 embodiment according to the present invention, illustrating operations for communicating access requests and short message acknowledgments in a radiotelephone system according to the present invention. In order to reduce the probability of collisions between access requests and short message acknowledgments, the access request communicating means 840 and the short message acknowledgment communicating means 850 of FIG. 8 communicate access requests and short message acknowledgements on the RACH carrier frequency band during first and second RACH message time windows 910,920, respectively. Although reduced rates of collision can still be achieved according to the invention if the first and second RACH message windows 910,920 overlap to some extent, the first and second RACH message time windows 910,920 preferably are separated by guard times 930. Preferably, these guard times are of sufficient duration to prevent collision between access requests and short message acknowledgments. The length of the guard times 930 required to prevent collisions typically will depend on the variations in propagation times between radiotelephones served by a particular central station. For example, in a mobile satellite radiotelephone communications system in which the central station is a satellite orbiting several hundreds, if not thousands, of miles above the radiotelephones it serves, the guard times 930 needed to prevent collisions may be on the order of several milliseconds in duration, corresponding to variations in signal propagation time between mobile radiotelephones positioned, for example, within a spot-beam cell of the system. In contrast, in a radiotelephone system using a less distant central station, the guard times 930 needed to prevent collisions may be relatively small.

As illustrated in FIG. 9, the first and second RACH message windows 910,920 are shown implemented in a periodic cycle including a first RACH message window 910 and a second RACH message window 920, separated by two guard times. Those skilled in the art will appreciate that other arrangements may be used with the present invention. For example, multiple windows for transmission of access requests could be associated with a single window for transmission of short message acknowledgments in a period of a cycle, or vice versa. Similarly, a cycle may include an even number of windows for one type of message and an odd number of windows for the other type of message. In addition, although the guard times between windows are shown as being the same in the embodiment of FIG. 9, those skilled in the art will understand that unequal guard times may also be employed with the present invention.

According to the preferred embodiment shown in FIG. 9, the first and second RACH message windows 910,920, form a RACH multiframe 900 coinciding with two downlink control channel multiframes 940. Those skilled in the art will appreciate that although the RACH multiframe preferably is synchronized in some fashion with the overall TDMA frame structure of the radiotelephone system, in general, the RACH multiframe 900 may be formed to coincide with an arbitrary multiple of downlink control channel multiframe or other multiframes. The RACH multiframe 900 may also be formed without coinciding with any particular frame, multiframe, superframe or multiple thereof; for example, a RACH multiframe may be formed which precesses with respect to a particular multiframe. In addition, the durations of the first and second RACH message time windows 910,920 need not remain fixed from cycle to cycle. For example, the duration of the windows may be dynamically adjusted depending on network parameters.

Figure 10:
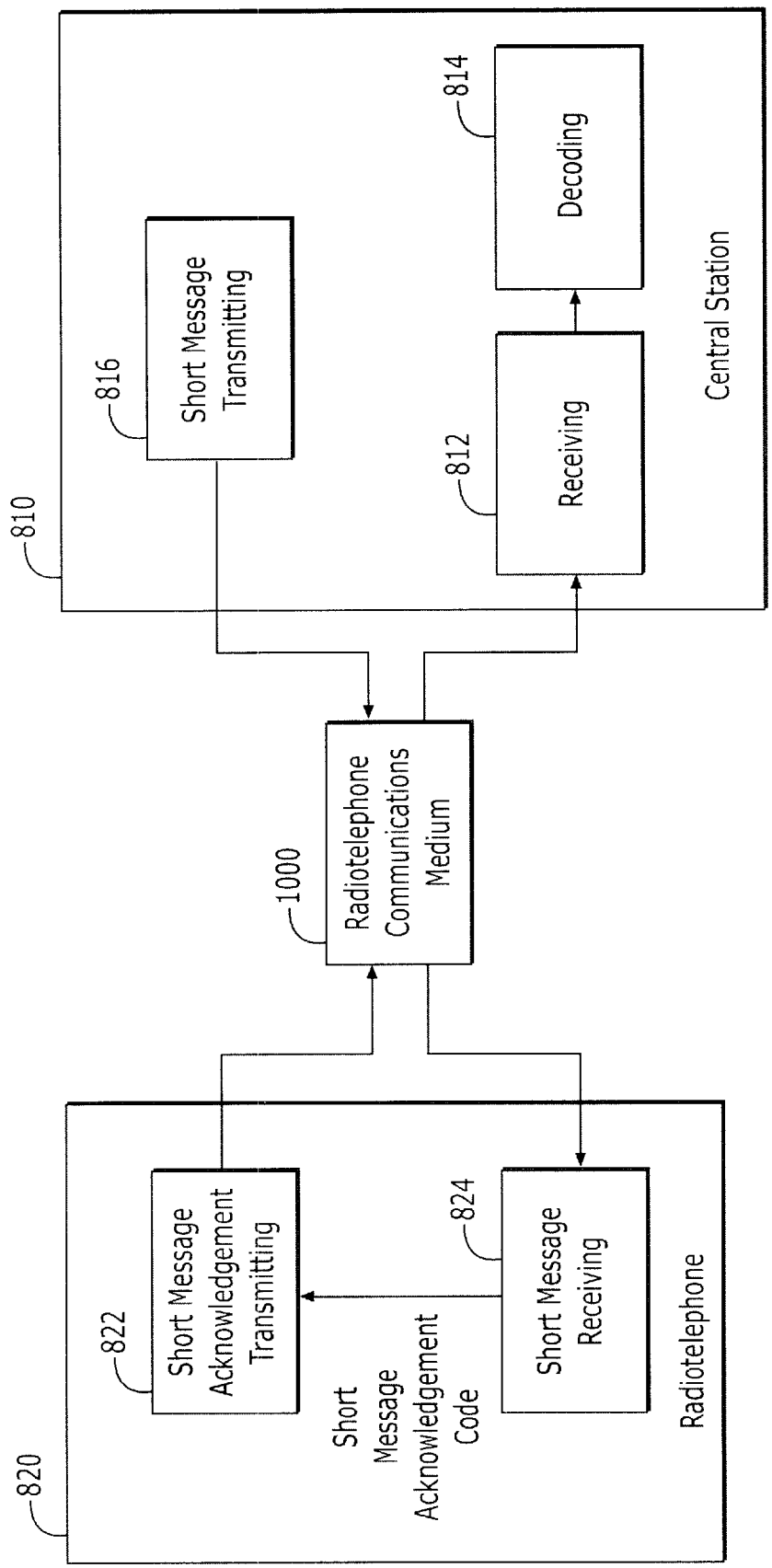
FIG. 10 illustrates a preferred embodiment of a radiotelephone communications system according to the present invention.

According to another aspect of the invention, illustrated in FIG. 10, the short message acknowledgments communicated from the radiotelephone 820 to the central station 810 are communicated according to a predetermined short message code, which may be communicated to the radiotelephone 820 in a short message sent from the central station 810 to the radiotelephone 820 or, for example, determined at the radiotelephone 820 using a predetermined paging group or similar identification. The radiotelephone 820 preferably includes short message acknowledgment transmitting means 822 for transmitting a radiotelephone communications signal representing a short message acknowledgment in a radiotelephone communications medium 1000, and the central station includes means 812 for receiving the transmitted radiotelephone communications signal and means 814 for decoding the received radiotelephone communications signal according to the predetermined short message code. Means may be provided for communicating a short message including the predetermined short message code from the central station 810 to the radiotelephone 820, for example, short message transmitting means 816 at the central station 810 which transmits a radiotelephone communications signal including the short message in the radiotelephone communications medium 1000, and short message receiving means 824 for receiving the transmitted short message. The short message code may also be derived at the radiotelephone 820, for example, from a predetermined paging group or similar identification. As with the other means described above, the transmitting and receiving means 812, 816, 822, 824 and the decoding means 814 include telecommunications components such as receivers, transmitters, signal processors, antennas, controllers, and the like, the detailed operations of which are well-known and need not be discussed in detail herein. Those skilled will also understand that these components may include special purpose hardware, software running on general purpose data processors, and combinations thereof.

The coding aspect described above may be combined with margin-enhancing coding used to improve communication of short message acknowledgments. For example, the short message code may represent a spreading sequence code which may be used to improve the probability of reception of the short message acknowledgement at the central station. Preferably, the short message codes are uniquely assigned to radiotelephone paging groups, such that a particular short message is delivered to a predetermined number of radiotelephones in a group during a particular RACH multiframe.

Preferably, only one radiotelephone in the group will receive the code during a given RACH multiframe, such that only one short message acknowledgment encoded according to the code is transmitted during the RACH message time window allocated for communicating short message acknowledgments, thus reducing the likelihood of collisions between short message acknowledgments.

Figure 11:
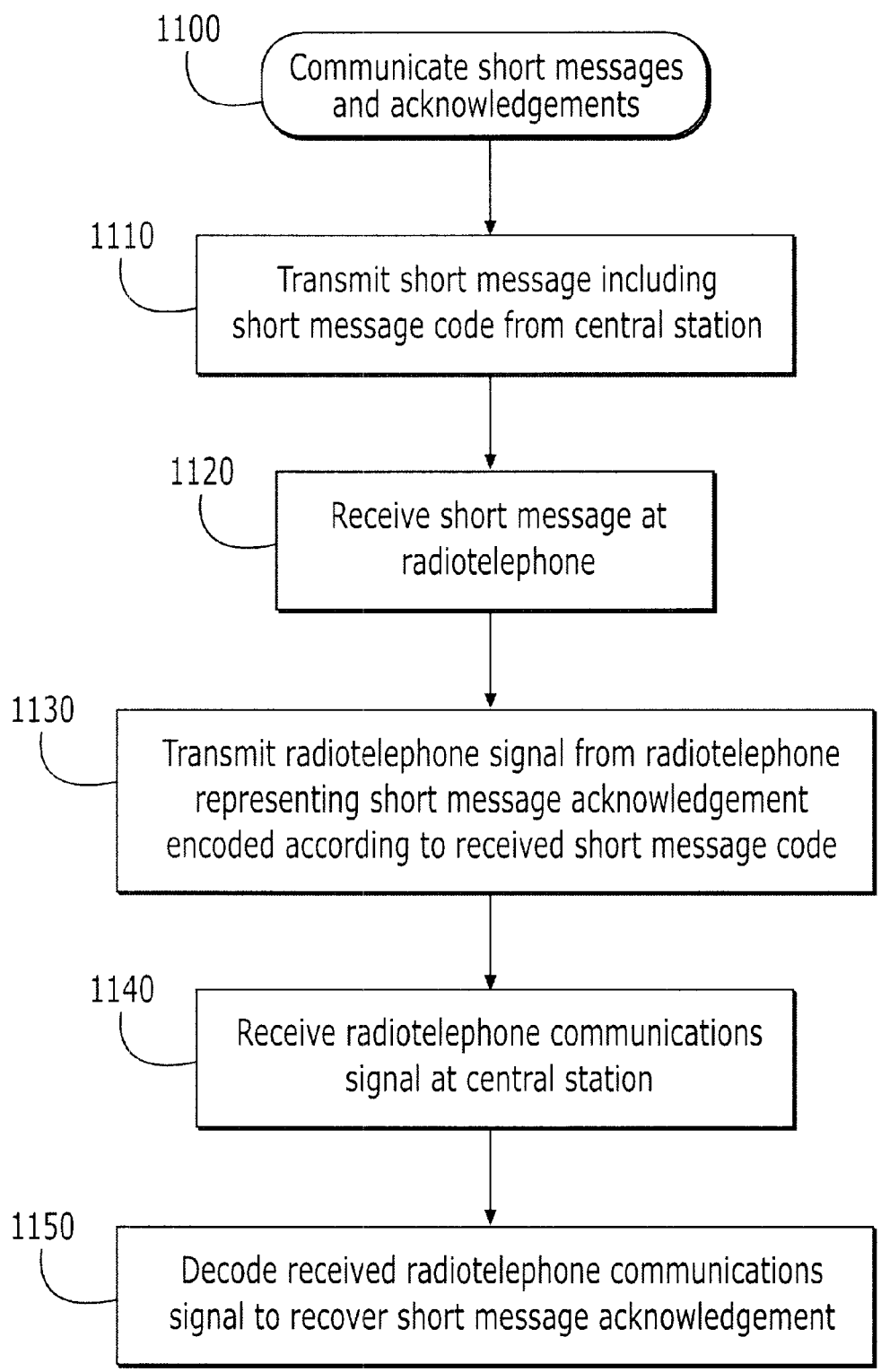
FIG. 11 illustrates operations for communicating short messages and short message acknowledgements in a preferred method according to the present invention.

A flowchart illustrating operations for communicating a short message and an acknowledgment thereto is provided in FIG. 11 (Block 1100). A short message including a predetermined short message code is transmitted from the central station (Block 1110), and received at a radiotelephone (Block 820). A radiotelephone communications signal representing a short message acknowledgment encoded according to the short message code is then transmitted from the radiotelephone (Block 1130). The radiotelephone communications signal is received at the central station (Block 1140), and then decoded according to the short message code to recover a short message acknowledgment (Block 1150). Those skilled in the art will appreciate that variations on these basic operations may be used with the present invention, such as additional coding, bit repetition, and message repetition for the short messages sent from the central station and the short message acknowledgments sent from the radiotelephone.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of communicating access requests and short message acknowledgments in a radiotelephone communications system including a central station and a plurality of radiotelephones communicating over a plurality of carrier frequency bands, the radiotelephone communications system including a short message service (SMS) for communicating short messages from the central station to the plurality of radiotelephones, the method comprising the steps:

communicating access requests from the plurality of radiotelephones to the central station over a random access channel carrier (RACH) frequency band during a first RACH message time window, the access requests representing requests for access to the radiotelephone system such that communication of access requests from the plurality of radiotelephones on the RACH carrier frequency band is constrained to occur during the first RACH message time window; and communicating short message acknowledgements from the plurality of radiotelephones to the central station over the RACH carrier frequency band during a second RACH message time window such that communication of short message acknowledgements from the plurality of radiotelephones on the RACH carrier frequency band is constrained to occur during the second RACH message time window.

2. A method according to claim 1 wherein the radiotelephone communications system is a time division multiple access (TDMA) radiotelephone communications system which communicates control messages between the central station and the plurality of radiotelephones over a plurality of carrier frequency bands during a plurality of TDMA control channel multiframes, each the TDMA control channel multiframes including a plurality of TDMA time slots, and:

wherein said step of communicating access requests comprises the step of communicating access requests during a first RACH message time window including a first set of TDMA time slots in a group of the TDMA control channel multiframes; and wherein said step of communicating short message acknowledgments comprises the step of communicating short message acknowledgements during a second RACH message time window including a second set of TDMA time slots in the group of TDMA control channel multiframes, to thereby form a RACH multiframe on the RACH carrier frequency band, the RACH multiframe including the first RACH message time window and the second RACH message time window.

3. A method according to claim 2 wherein said first and second RACH message time windows are separated by a guard time.

4. A method according to claim 2 wherein the radiotelephone communications system comprises a radiotelephone communications medium over which radiotelephone communications signals are communicated between the central station and the plurality of radiotelephones, and wherein said step of communicating short message acknowledgements comprises the following steps:

transmitting a radiotelephone communications signal from one of the radiotelephones, the radiotelephone communications signal representing a short message acknowledgement encoded according to a predetermined short message code, in response to communication of a short message to the one radiotelephone; and receiving the radiotelephone communications signal at the central station;

decoding the received radiotelephone communications signal at the central station to thereby recover a short message acknowledgement.

5. A method according to claim 4 wherein said step of transmitting is preceded by the step of:

communicating a short message including the predetermined short message code from the central station to the one radiotelephone.

6. A method according to claim 5 wherein the plurality of radiotelephones are arranged in a plurality of paging groups, and:

wherein said step of communicating a short message including the predetermined short message code to the one radiotelephone is preceded by the step of assigning a unique short message code to each paging group; and wherein said step of communicating a short message including the predetermined short message code comprises the step of communicating a short message including the unique short message code assigned to the paging group of which the one radiotelephone is a member.

7. A method according to claim 6 wherein said step of communicating a short message including the unique short message code comprises the step of communicating a short message including a unique short message code assigned to the paging group of which the one radiotelephone is a member to a predetermined number of radiotelephones in the paging group during a RACH multiframe.

8. A method according to Claim 6 wherein said step of communicating a short message including the unique short message code comprises the step of communicating a short message including a unique short message code assigned to the paging group to only one radiotelephone in the paging group during a RACH multiframe.

9. A method according to claim 1 wherein said first and second RACH message time windows are separated by a guard time.

10. A method of communicating access requests and short message acknowledgements in a time-division multiple access (TDMA) radiotelephone communications system, the TDMA radiotelephone communications system communicating between a central station and a plurality of radiotelephones over a plurality of carrier frequency bands, the plurality of radiotelephones communicating access requests to the central station over a random access channel (RACH) carrier frequency band, the radiotelephone communications system including a short message service (SMS) which communicates alphanumeric messages from the central station to the plurality of radiotelephones and communicates short message acknowledgements from the plurality of radiotelephones to the central station over the RACH carrier frequency band in response to the short messages, the method comprising the steps of:

time-division-multiplexing the access requests and the short message acknowledgements on the RACH carrier frequency band into a first RACH message time window and a second RACH message time window, respectively such that transmission of access requests on the RACH carrier frequency band is constrained to occur during, the first RACH message time window and transmission of short message acknowledgements on the RACH carrier frequency band is constrained to occur during the second RACH message time window.

11. A method according to claim 10 wherein said first and second RACH message time windows are separated by a guard time.

12. A method according to claim 10 wherein the radiotelephone communications system communicates control messages between the central station and the plurality of radiotelephones over a plurality of carrier frequency bands during a plurality of TDMA control channel multiframes, each the TDMA control channel multiframes including a plurality of TDMA time slots, and wherein said step of time-division-multiplexing comprises the step of:

time-division-multiplexing access requests and short message acknowledgements into a first RACH message time window including a first set of TDMA time slots in a group of the TDMA control channel multiframes and a second RACH message time window including a second set of TDMA time slots in the group of TDMA control channel multiframes, respectively, to thereby form a RACH multiframe on the RACH carrier frequency band including the first RACH message time window and the second RACH message time window.

13. A method according to claim 12 wherein said first and second RACH message time windows are separated by a guard time.

14. A radiotelephone communications system, comprising:

a central station;

a plurality of radiotelephones;

short message communicating means for communicating alphanumeric messages from said central station to the plurality of radiotelephones;

access request communicating means for communicating access requests from the plurality of radiotelephones to the central station over a random access channel (RACH) carrier frequency band during a first RACH message time window, the access requests representing requests for access to the radiotelephone communications system, such that communication of access requests from the plurality of radiotelephones on the RACH carrier frequency band is constrained to occur during the first RACH message time window; and short message acknowledgement communicating means, responsive to said short messages, for communicating short message acknowledgements from the plurality of radiotelephones to the central station over the RACH carrier frequency band during a second RACH message time window, such that communication of short message acknowledgements from the plurality of radiotelephones on the RACH carrier frequency band is constrained to occur during the second RACH message time window.

15. A system according to claim 14, further comprising: time division multiple access (TDMA) control message communicating means for communicating control messages between the central station and the plurality radiotelephones over a plurality of carrier frequency bands during a plurality of TDMA control channel multiframes, each of the TDMA control channel multiframes including a plurality of TDMA time slots, and:

wherein said access request means comprises means for communicating access requests during a first RACH message time window including a first set of TDMA time slots in a group of the TDMA control channel multiframes; and wherein said short message acknowledgment communicating means comprises means for communicating short message acknowledgements during a second RACH message time window including a second set of TDMA time slots in the group of TDMA control channel multiframes to thereby form a RACH multiframe on the RACH carrier frequency band, the RACH multiframe including the first RACH message time window and the second RACH message time window.

16. A system according to claim 15 wherein said first and second RACH message time windows are separated by a guard time.

17. A system according to claim 15, further comprising a radiotelephone communications medium over which radiotelephone communications signals are communicated between the central station and the plurality of radiotelephones, and:

wherein each of said plurality of radiotelephones comprises short message acknowledgement transmitting means for transmitting a radiotelephone communications signal representing a short message acknowledgement encoded according to a predetermined short message code, in the radiotelephone communications medium;

wherein said central station comprises:

means, responsive to said radiotelephone communications medium, for receiving a radiotelephone communications signal from the radiotelephone communications medium; and means, responsive to said receiving means, for decoding the received radiotelephone communications signal according to the predetermined short message code to thereby recover a short message acknowledgement.

18. A system according to claim 17, wherein said short message communicating means further comprises means for communicating a short message including a predetermined short message code from the central station to a radiotelephone.

19. A system according to claim 18:

wherein said plurality of radiotelephones is organized into a plurality of paging groups, each paging group having a unique short message code assigned thereto;

wherein said short message communicating means comprises means for communicating a short message including a unique short message code assigned to a paging group; and wherein said short message acknowledgment transmitting means comprises means for transmitting a radiotelephone communications signal representing a short message acknowledgment encoded according to a communicated unique short message code.

20. A system according to claim 19 wherein said means for communicating a short message including a unique short message code assigned to a paging group comprises means for communicating a short message including the unique short message code to a predetermined number of radiotelephones in the group during a RACH multiframe.

21. A system according to claim 19 wherein said means for communicating a short message including a unique short message code assigned to a paging group comprises means for communicating a short message including the unique short message code to only one radiotelephone in the group during a RACH multiframe.

22. A system according to claim 14 wherein said first and second RACH message time windows are separated by a guard time.

23. A radiotelephone for communicating with a central station in a radiotelephone communications system, the radiotelephone comprising:

short message receiving means for receiving short messages from the central station;

access request transmitting means for transmitting access requests from the radiotelephone over a random access channel (RACH) carrier frequency band during a first RACH message time window, the access request representing a request for access to the radiotelephone communications system, such that communication of access requests from the radiotelephone on the RACH carrier frequency band is constrained to occur during the first RACH message time window; and short message acknowledgement transmitting means, responsive to said short message receiving means, for transmitting short message acknowledgements from the radiotelephone over the (RACH) carrier frequency band during a second RACH message time window, each of said short message acknowledgments being transmitted in response to receipt of a short message from the central station at a radiotelephone such that communication of short message acknowledgements from the radiotelephone on the RACH carrier frequency band is constrained to occur during the second RACH message time window.

24. A radiotelephone according to claim 23, further comprising time division multiple access (TDMA) control message receiving means for receiving control messages from the central station over a plurality of carrier frequency bands during a plurality of TDMA control channel multiframes, each of the TDMA control channel multiframes including a plurality of TDMA time slots, and:

wherein said access request transmitting means comprises means for transmitting access requests during a first RACH message time window including a first set of TDMA time slots in a group of the TDMA control channel multiframes; and wherein said short message acknowledgment transmitting means comprises means for transmitting short message acknowledgements during a second RACH message time window including a second set of TDMA time slots in the group of TDMA control channel multiframes of a RACH multiframe on the RACH carrier frequency band, the RACH multiframe including the first RACH message time window and the second RACH message time window.

25. A radiotelephone according to claim 24 wherein said first and second RACH message time windows are separated by a guard time.

26. A radiotelephone according to claim 23 wherein said first and second RACH message time windows are separated by a guard time.

27. A radiotelephone according to claim 23 wherein the radiotelephone communications-system includes a radiotelephone communications medium over which radiotelephone communications signals are communicated between the central station and radiotelephones, and wherein said short message acknowledgment transmitting means comprises:

means for transmitting a radiotelephone communications signal representing a short message acknowledgment encoded according to a predetermined short message code.

28. A radiotelephone according to claim 27:

wherein said short message receiving means comprises means for receiving a short message including the predetermined short message code; and wherein said short message acknowledgment transmitting means comprises means for transmitting a radiotelephone communications signal encoded according to the received predetermined short message code.

* * * * *